(12) United States Patent
Stadtfeld

(10) Patent No.: US 11,090,744 B2
(45) Date of Patent: Aug. 17, 2021

(54) TOPLAND CHAMFERING OF GEARS

(71) Applicant: THE GLEASON WORKS, Rochester, NY (US)

(72) Inventor: Hermann J. Stadtfeld, Webster, NY (US)

(73) Assignee: THE GLEASON WORKS, Rochester, NY (US)

( * ) Notice: Subject to any disclaimer, the term of this patent is extended or adjusted under 35 U.S.C. 154(b) by 10 days.

(21) Appl. No.: 16/096,726

(22) PCT Filed: May 19, 2017

(86) PCT No.: PCT/US2017/033501
§ 371 (c)(1),
(2) Date: Oct. 26, 2018

(87) PCT Pub. No.: WO2017/201385
PCT Pub. Date: Nov. 23, 2017

(65) Prior Publication Data
US 2019/0134727 A1 May 9, 2019

Related U.S. Application Data

(60) Provisional application No. 62/338,653, filed on May 19, 2016.

(51) Int. Cl.
*B23F 19/10* (2006.01)
*B23F 9/08* (2006.01)
(Continued)

(52) U.S. Cl.
CPC ............. *B23F 19/107* (2013.01); *B23F 1/02* (2013.01); *B23F 1/06* (2013.01); *B23F 9/02* (2013.01);
(Continued)

(58) Field of Classification Search
CPC .. B23F 19/107; B23F 1/02; B23F 1/06; B23F 9/02; B23F 9/08; B23F 15/06;
(Continued)

(56) References Cited

U.S. PATENT DOCUMENTS 2,324,182 A * 7/1943 Wildhaber ................ B23F 9/10
409/44
2,329,804 A 9/1943 Wildhaber
(Continued)

FOREIGN PATENT DOCUMENTS

CN 101879635 A 11/2010
DE 202008000645 U1 7/2008
(Continued)

OTHER PUBLICATIONS

Machine Translation DE 102009020771 A1, which DE 771 was published Nov. 2010.*
(Continued)

*Primary Examiner* — Dung Van Nguyen
(74) *Attorney, Agent, or Firm* — Robert L. McDowell

(57) ABSTRACT

A method wherein a cutting or grinding chamfering tool (25) is guided along the face width of a gear (12, 23, 52) through one tooth slot (8) (e.g. from heel to toe) while it contacts the topland corners (10, 1 1) of the respective concave and convex tooth flanks of adjacent teeth (2, 4). The tool moves to an index position, the gear is indexed to the next tooth slot position and the tool moves through the tooth slot (e.g. from the toe to the heel). The cycle is repeated until all topland corners are chamfered.

14 Claims, 8 Drawing Sheets

(51) Int. Cl.
*B23F 1/02* (2006.01)
*B23F 1/06* (2006.01)
*B23F 9/02* (2006.01)
*B23F 19/12* (2006.01)
*B23F 15/06* (2006.01)
*B23F 19/00* (2006.01)
B23F 21/02 (2006.01)
B23F 21/14 (2006.01)
B23F 21/12 (2006.01)

(52) U.S. Cl.
CPC .............. *B23F 9/08* (2013.01); *B23F 15/06* (2013.01); *B23F 19/00* (2013.01); *B23F 19/12* (2013.01); *B23F 21/02* (2013.01); *B23F 21/122* (2013.01); *B23F 21/14* (2013.01)

(58) Field of Classification Search
CPC .......... B23F 19/00; B23F 19/12; B23F 21/02; B23F 21/122; B23F 21/14
USPC .......................................................... 451/47
See application file for complete search history.

(56) References Cited

U.S. PATENT DOCUMENTS

| | | | | |
|---|---|---|---|---|
| 2,857,819 | A | | 10/1958 | Wildhaber et al. |
| 2,897,634 | A | * | 8/1959 | Wildhaber ................ B23F 1/02 451/47 |
| 3,417,510 | A | * | 12/1968 | Wildhaber ................ B23F 1/02 451/219 |
| 3,916,569 | A | * | 11/1975 | Wydler ..................... B23F 5/06 451/5 |
| 4,400,916 | A | * | 8/1983 | Bloch ....................... B23F 5/06 451/21 |
| 4,949,456 | A | * | 8/1990 | Kovach ..................... B23F 9/02 29/893.35 |
| 5,033,239 | A | * | 7/1991 | Phillips .................... B23F 21/16 407/23 |
| 5,374,142 | A | * | 12/1994 | Masseth ................ B23F 21/226 407/23 |
| 5,624,301 | A | * | 4/1997 | Lenz ....................... B23F 1/026 451/21 |
| 5,681,207 | A | * | 10/1997 | Nishida .................... B23F 1/02 409/38 |
| 5,954,568 | A | * | 9/1999 | Wirz ..................... B24B 53/075 125/11.01 |
| 6,050,883 | A | * | 4/2000 | Wiener ................... B23F 9/025 451/47 |
| 6,077,150 | A | * | 6/2000 | Jankowski ............ B24B 53/075 451/147 |
| 6,146,253 | A | * | 11/2000 | Litvin ..................... B23F 15/06 451/47 |
| 6,234,880 | B1 | * | 5/2001 | Scacchi ............... B23F 23/1225 451/443 |
| 6,712,566 | B2 | | 3/2004 | Stadtfeld et al. |
| 8,961,081 | B2 | * | 2/2015 | Ronald .................. B23F 19/10 409/8 |
| 9,192,998 | B2 | * | 11/2015 | Augsburg ............. B23F 19/107 |
| 9,216,466 | B2 | * | 12/2015 | Glasow ..................... B23Q 7/03 |
| 10,092,995 | B2 | * | 10/2018 | Gaiser ..................... B23F 9/025 |
| 10,532,439 | B2 | * | 1/2020 | Barensteiner ............. B24B 3/24 |
| 10,702,935 | B2 | * | 7/2020 | Strunk ..................... B23F 19/06 |
| 2005/0064794 | A1 | * | 3/2005 | Blasberg .................. B23F 9/10 451/5 |
| 2005/0272354 | A1 | * | 12/2005 | Kidowaki ................ B21H 3/02 451/219 |
| 2008/0070484 | A1 | * | 3/2008 | Stadtfeld ................ B23F 19/00 451/47 |
| 2008/0292420 | A1 | * | 11/2008 | Faulstich .............. B23F 19/002 409/8 |
| 2014/0053405 | A1 | | 2/2014 | Fleischer et al. |
| 2015/0202705 | A1 | * | 7/2015 | Bittner .................... F16H 55/17 74/457 |
| 2016/0121414 | A1 | * | 5/2016 | Ochi .................... B23F 23/1225 451/47 |
| 2016/0151847 | A1 | * | 6/2016 | Reichert ............... B24B 53/075 451/47 |
| 2016/0199926 | A1 | * | 7/2016 | Bolze ..................... F16H 55/17 451/47 |

FOREIGN PATENT DOCUMENTS

DE 102009020771 A1 * 11/2010
GB 740607 A 11/1955

OTHER PUBLICATIONS

International Search Report and Written Opinion for PCT/US2017/033501, ISA/EPO, dated Aug. 23, 2017, 11 pgs.

* cited by examiner

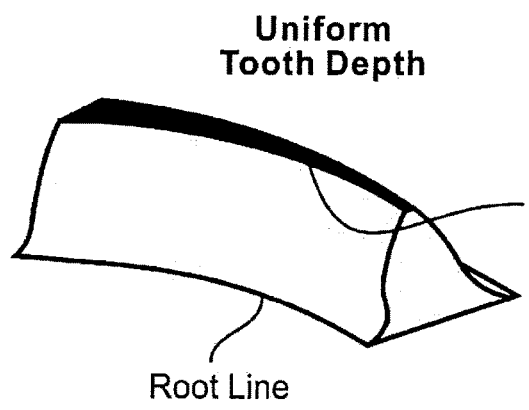
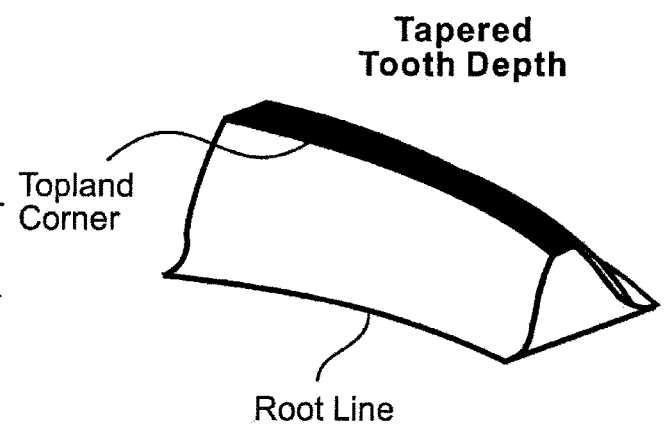
FIG. 1(a)    FIG. 1(b)
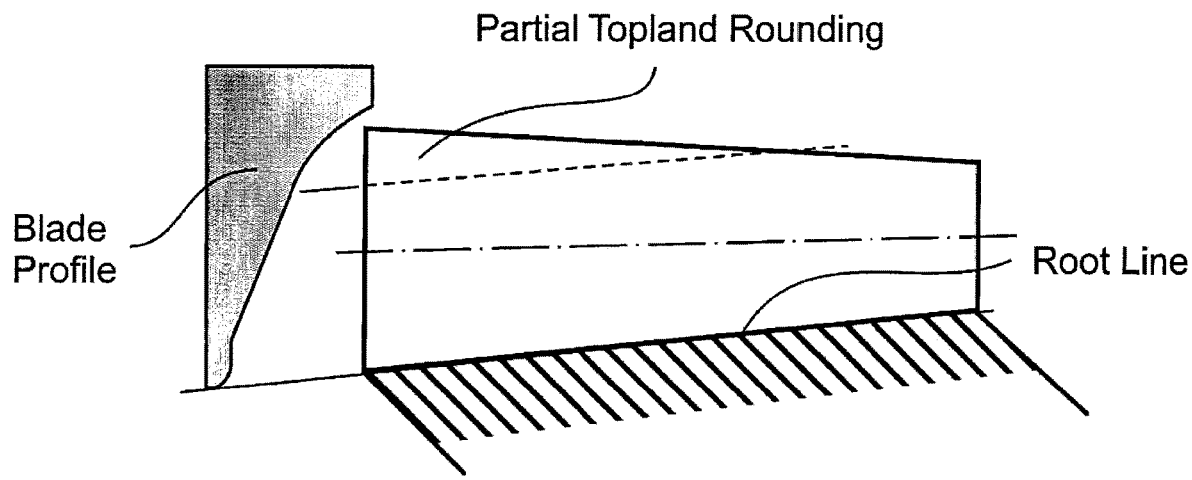
FIG. 2

TOPLAND CHAMFERING OF GEARS

FIELD OF THE INVENTION

The invention is directed to the manufacture of gears, such as bevel ring gears and pinions, and in particular to the formation of a topland chamfer on gears.

BACKGROUND OF THE INVENTION

Bevel and hypoid gears (pinions and ring gears) can be cut in a single or intermittent indexing process (face milling) or in a continuous indexing process (face hobbing). The face hobbing process produces tooth proportions where the face cone angle is identical to the root cone angle. Thus, face hobbed bevel gears have parallel (i.e. uniform) depth teeth as shown in FIG. 1(a). Because the cutting blade movement is always oriented parallel to the root line, it will also be parallel to the topland corner of the teeth. If the face hobbing blades feature a shoulder with a cutting edge as disclosed by U.S. Pat. No. 5,374,142 to Masseth for example, then it is possible to cut a topland chamfer or topland rounding (i.e. tip relief), which gives a smooth transition between the tooth flank surface and the topland.

The face milling process produces tooth proportions where the face cone angle is larger than the root cone angle. Thus, face milled bevel gears have tapered depth teeth as shown in FIG. 1(b). Because of the cutting blade movement is always oriented parallel to the root, it is only possible to machine a topland rounding or chamfer in a triangular shaped section along the face width (i.e. tooth length) or along a part of the face width. A triangular section presents a compromise between excess chamfer width on the heel side of the tooth (outer end of the teeth) and no chamfer on the toe side of the tooth (inner end of the teeth), as shown in FIG. 2.

Topland chamfers or topland corner rounding is desired by many manufacturers of bevel and hypoid gears. This so-called "Topping" provides a smoother tooth meshing especially under load conditions which cause gear and housing deflections and is also beneficial in cases where manufacturing and assembly tolerances add up to large gearset position deviations. Another application of topping is found in gearsets with high power density requirements which undergo a shot peening treatment after the final grinding operation. The shot peening may cause some material build-up around the craters formed by the ball impacts. The small amounts of build-up present tooth mesh disturbances and may also cause an increase of local surface stress. A topping operation after grinding will remove the spots of material build-up and deliver the additional advantages of smooth tooth engagement even under high load.

SUMMARY OF THE INVENTION

The invention comprises a method wherein a cutting or grinding chamfering tool is guided along the face width of a gear through one tooth slot (e.g. from heel to toe) while it contacts the topland corners of the adjacent respective convex and concave tooth flanks. The tool moves to an index position, the gear is indexed to the next tooth slot position and the tool moves through the tooth slot (e.g. from the toe to the heel). The cycle is repeated until all topland corners are chamfered.

BRIEF DESCRIPTION OF THE DRAWINGS

FIG. 1(a) shows a three-dimensional view of a tooth with uniform depth.

FIG. 1(b) shows a three-dimensional view of a tooth with tapered depth.

FIG. 2 shows in a simplified two-dimensional view a cutting blade which follows the root line of a pinion or gear. The blade can be ground with a rounded shoulder that will chamfer a triangular area which only extends partially along the face width of the tooth.

DETAILED DESCRIPTION OF THE PREFERRED EMBODIMENT

Figure 3:
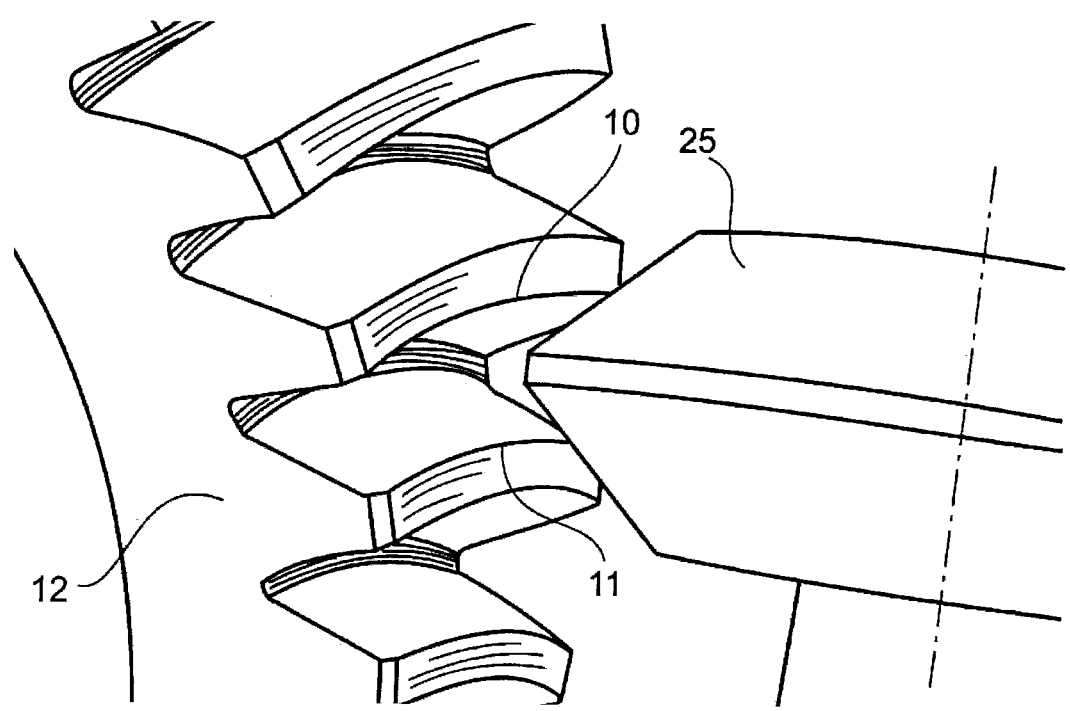
FIG. 3 shows a three-dimensional graphic with the chamfering tool engaged in one of the tooth slots.

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The use of "including", "having" and "comprising" and variations thereof herein is meant to encompass the items listed thereafter and equivalents thereof as well as additional items.

The details of the invention will now be discussed with reference to the accompanying drawings which illustrate the invention by way of example only. In the drawings, similar features or components will be referred to by like reference numbers. Although references may be made below to directions such as upper, lower, upward, downward, rearward, bottom, top, front, rear, etc., in describing the drawings, these references are made relative to the drawings (as normally viewed) for convenience. These directions are not intended to be taken literally or limit the present invention in any form. In addition, terms such as "first", "second", "third", etc., are used to herein for purposes of description and are not intended to indicate or imply importance or significance.

FIG. 3 shows a convex topland corner 10 and the concave topland corner 11 of a ring gear section 12 and a chamfering tool 25. The cutting or grinding chamfering tool 25 is guided along the face width of a gear through one tooth slot (e.g. from heel to toe) while it contacts the topland corners 10, 11 of the adjacent respective convex and concave tooth flanks. The tool moves to an index position, the ring gear or pinion is indexed to the next tooth slot position and the tool 25 moves through the slot from the toe to the heel. This cycle repeats until all topland corners are chamfered.

The inventive method may be explained in detail by referring to an example of ring gear topland chamfering. A ring gear can be rotated such that the average topland tangent of the convex and concave tooth flank points which are contacted by the tool is horizontal (or has any other desired orientation) in the axial plane of the ring gear. This allows the placement of the tool axis in a vertical orientation in a CNC machine, for example in the work chamber of a free-form bevel gear cutting machine such as the machine disclosed in, for example, U.S. Pat. No. 6,712,566 the disclosure of which is hereby incorporated by reference.

Figure 4:
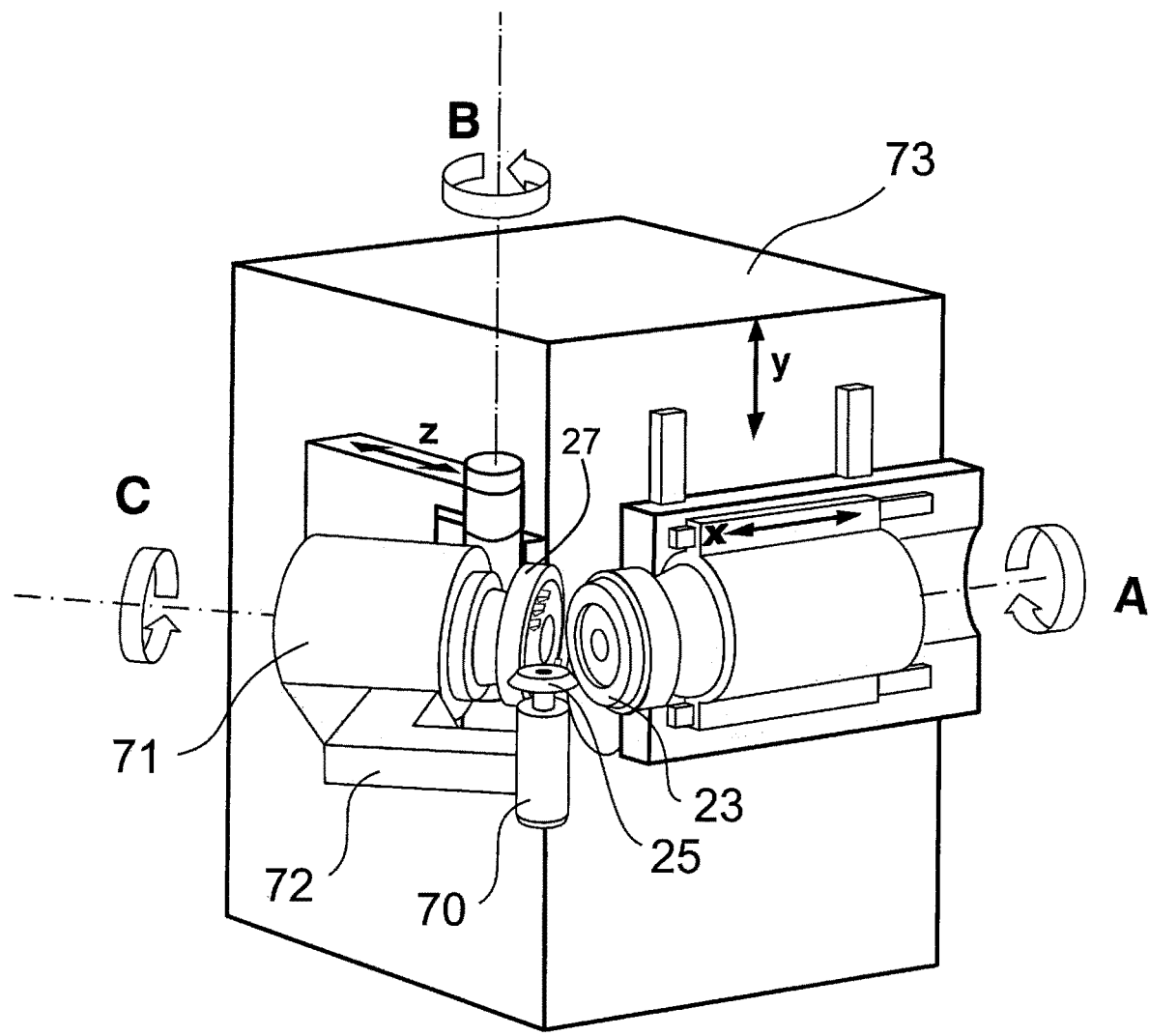
FIG. 4 shows a three dimensional view of a free-form bevel gear cutting machine with an attached chamfering unit and tool.

FIG. 4 shows a free-form bevel gear cutting machine 73, as mentioned above, wherein a chamfering tool 25 is located next to a cutter head 27 which is used to cut the slots in gear workpiece 23. A chamfering unit 70 is attached to the tool spindle housing 71 via a support arm 72. After the slot cutting, the chamfering tool 25, which is rigidly connected to the cutter spindle housing, is moved with the existing CNC machine axes to perform the chamfering operation. The chamfering unit 70 comprises an electric motor, spindle housing and a spindle nose to which the tool 25 is releasably connected. Except for the additional rotation of the chamfer tool spindle, there are no movements or freedoms required in addition to the existing axes of the free-form bevel gear cutting or grinding machine.

Figure 5:
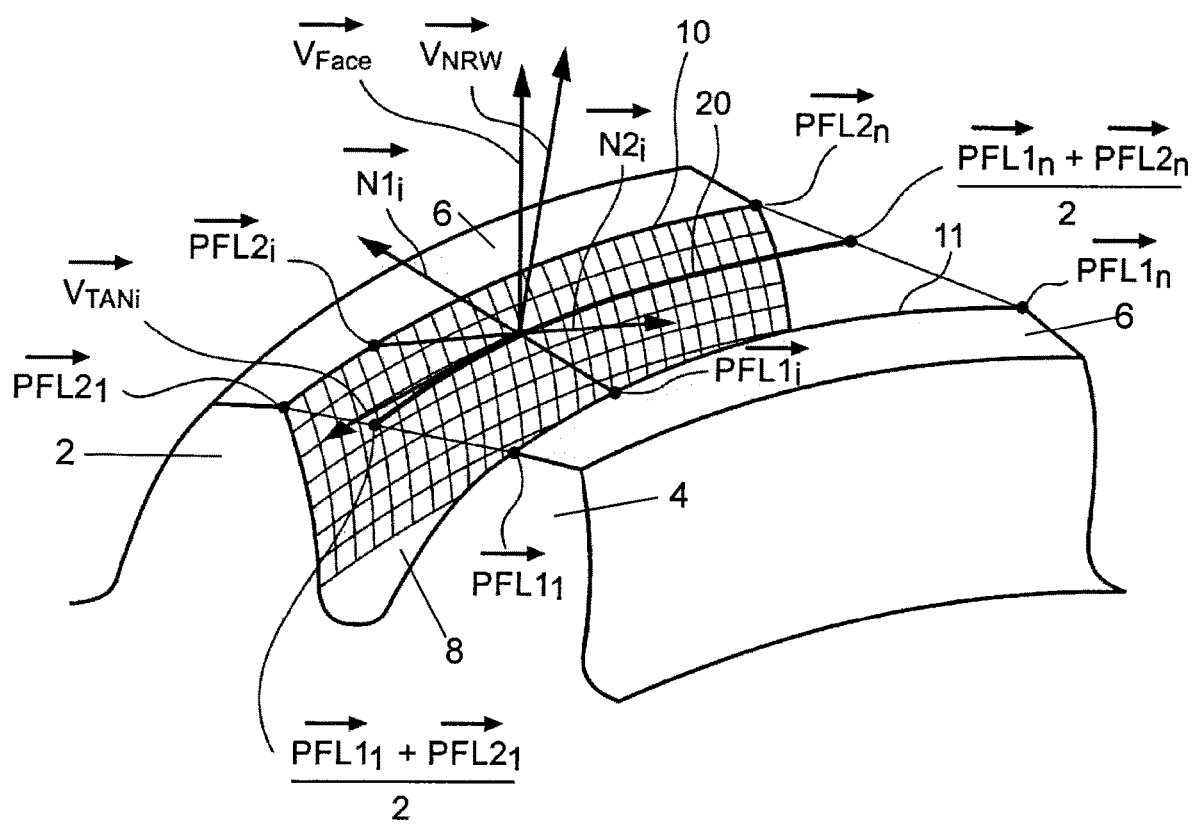
FIG. 5 shows a three-dimensional view of two adjacent teeth. The flank surfaces which form the slot between the two teeth have nominal grid points (shown is the grid on the visible flank). Tool path 20 and normal and tangent vectors are used to calculate the tool center movement during chamfering.

FIG. 5 shows a three-dimensional view of two adjacent teeth 2, 4 having toplands 6. The adjacent flank surfaces which form the slot 8 between the adjacent teeth have nominal grid points (shown is the grid on the visible tooth flank). Tool path 20 is calculated from the average of adjacent points along the topland corners 10 and 11. The cross product of the normal vectors of adjacent points delivers the tangent vector $V_{Tan}$. The tool radius vector direction is calculated from the face cone vector $V_{Face}$, which is rotated around $V_{Tan}$ in order to lie in plane Y-Z (FIG. 6).

The inventive method is preferably based on the utilization of nominal flank surface data. A preferred mathematical approach, developed for the inventive chamfering method, determines the tool path 20 (FIG. 5) as the average of the topland corner points $PFL1_1$ and $PFL2_1$ to $PFL1_n$ and $PFL2_n$. The cross product of the normal vector of a convex topland flank point $N1_i$ and a concave topland flank point $N2_i$ delivers the average tangent vector $V_{TANi}$, which is directed tangentially to the tool path 20 at each of the discrete points along the face width. The direction of the tangent vector $V_{Tan}$ (direction 22 in FIG. 6) is utilized to rotate the work around its Z-axis (rotation 26) until the tangent vector of each instant point of tool contact is oriented horizontally.

Figure 6:
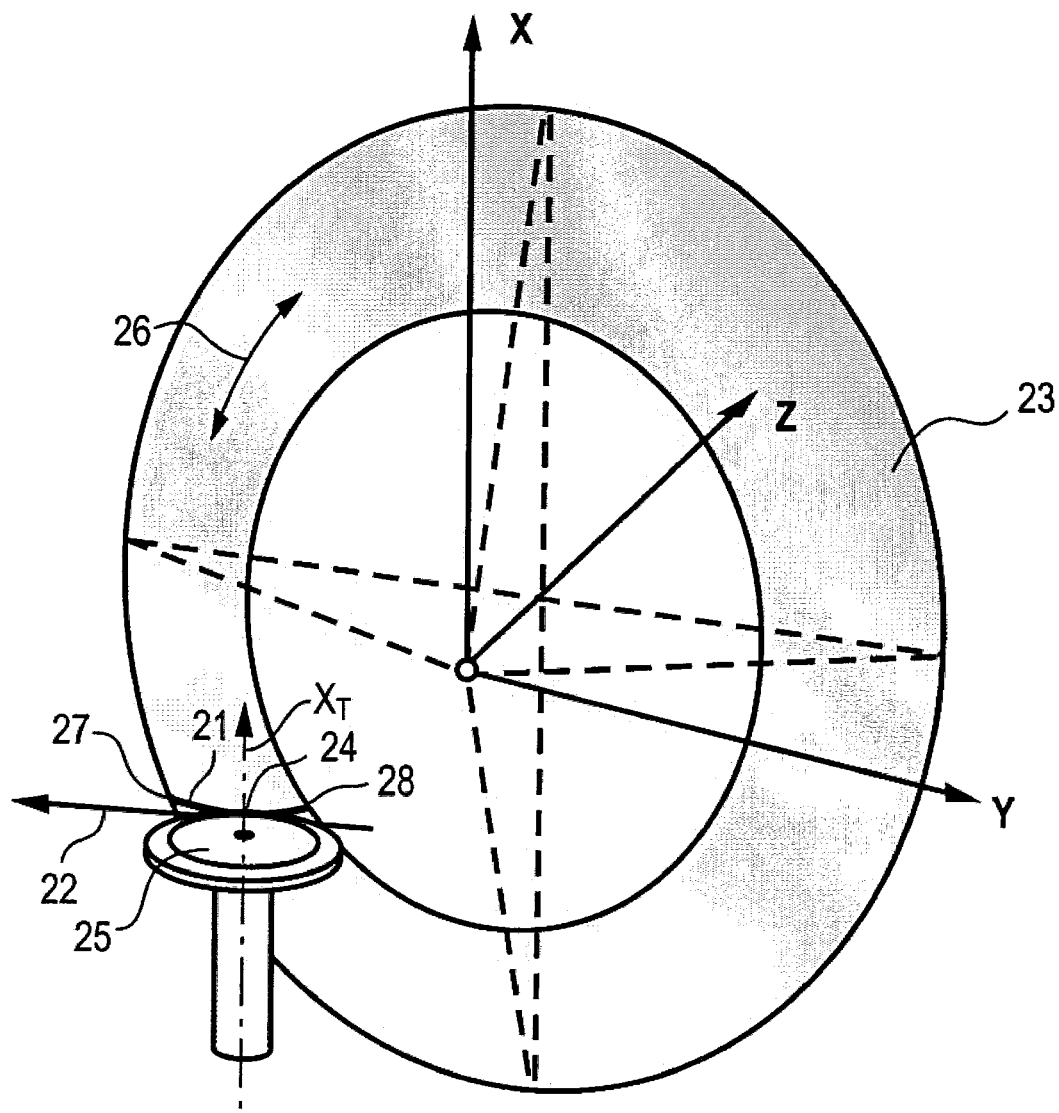
FIG. 6 shows a simplified three-dimensional representation of a ring gear 23 with a Cartesian coordinate system, a cutter path 21, a flank center point 24 and a cutter path tangent vector 22. The chamfering tool 25 is drawn at the center tooth position.

FIG. 6 shows a simplified three-dimensional representation of a ring gear 23 with a Cartesian coordinate system, a cutter path 21, a flank center point 24 and a cutter path tangent vector 22. The cutter path 21 has a heel end 27 and a toe end 28. The gear can rotate around the Z-axis which is shown as rotation 26. A chamfering tool 25 is positioned in front of the gear and contacts the cutter path at location 24. The tool axis $X_T$ is oriented vertical, which is the same direction than the X-axis of the ring gear bound coordinate system.

In order to avoid any gaging of the inventive unit, the stock division, which is required during the machine setup, is additionally used to synchronize the actual stock division point with the calculated tool path 21. The stock division is performed in the middle of the face width 24 with a horizontal tool path tangent vector 22. The tangent vector 22 of the slot, chosen for the stock division, is rotated into a horizontal orientation (orientation of the Y-Z-plane) by rotating the gear around its Z-axis (rotation 26). The horizontal orientation may be confirmed by inserting a level indicator or tool into the tooth slot preferably at the middle of the gear face width. Then the tool is moved in jog mode into the slot such that the two adjacent cutting edges just contact the two adjacent topland corners at mid face. The found position has an X, Y, and Z-component and an additional work axis position angle which are transferred into the input file of the chamfering program.

Depending on the tool diameter, the contact point between tool and topland corner of the convex flank may be shifted towards the toe 28 and the contact point between tool and topland corner of the concave flank is shifted towards the heel 27. Such a shift is acceptable if the distance between the contact points does not exceed about 30% of the width of the tooth slot. The chamfer correction features can be used to optimize the chamfer geometry if a large shift between the contact points leads to distorted chamfer geometry. It is recommended to utilize the smallest possible chamfer tool diameter in order to avoid or minimize contact point shift.

The mathematical axes position points along the face width minus the mathematical axes positions in the stock division position plus the values required to bring the tool in contact with the two topland corners in the stock division position delivers the real machine tool axes positions for the tool to slide along the face width of the work:

$$X_i = AXCTPT(1)_i - AXCTPT(1)_{stock\ div} + XSTDV \quad (1)$$

$$Y_i = AXCTPT(2)_i - AXCTPT(2)_{stock\ div} + YSTDV \quad (2)$$

$$Z_i = AXCTPT(3)_i - AXCTPT(3)_{stock\ div} + ZSTDV \quad (3)$$

$$A_i = ZANG_i - ZANG_{stock\ div} + ASTDV \quad (4)$$

where:
$X_i$ . . . Machine tool X-axis position
$Y_i$ . . . Machine tool Y-axis position
$Z_i$ . . . Machine tool Z-axis position
$A_i$ . . . Machine tool work-axis position
$AXCTPT(1)_i$ . . . Mathematical X-value at point$_i$
$AXCTPT(2)_i$ . . . Mathematical Y-value at point$_i$
$AXCTPT(3)_i$ . . . Mathematical Z-value at point$_i$
$ZANG_i$ . . . Mathematical work-axis angle at point$_i$
$AXCTPT(1)_{stock\ div}$ . . . Mathematical X-value at the stock division point
$AXCTPT(2)_{stock\ div}$ . . . Mathematical Y-value at the stock division point
$AXCTPT(3)_{stock\ div}$ . . . Mathematical Z-value at the stock division point $ZANG_{stock\ div}$ ... Mathematical work-axis value at the stock division point XSTDV ... Machine X-axis position when tool is in contact with both topland corners in the stock division position YSTDV ... Machine Y-axis position when tool is in contact with both topland corners in the stock division position ZSTDV ... Machine Z-axis position when tool is in contact with both topland corners in the stock division position ASTDV ... Machine work-axis position when tool is in contact with both topland corners in the stock division position The mathematical coordinate system is a ring gear oriented Cartesian X-Y-Z system including the work axis rotation 26 around the Z-axis in as shown in FIG. 6.

Figure 7A:
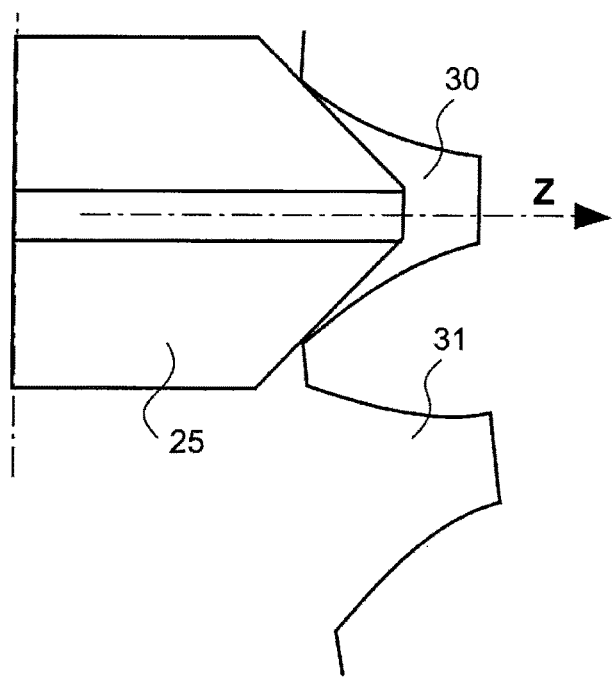
FIG. 7(a) shows the two-dimensional projection of a chamfering tool engaged in a tooth slot located at the gear center plane.

FIG. 7(a) shows the two-dimensional projection of a chamfering tool 25 engaged in a slot 30 shown in the gear center plane (X-Z plane in FIG. 6). Such a position is used, for example, for the topland chamfering of straight bevel gears. In case of spiral bevel and hypoid gears the tool path is required to have a tangent vector which is horizontal (i.e. lies in the Y-Z plane of the ring gear bound coordinate system in FIG. 6).

Figure 7B:
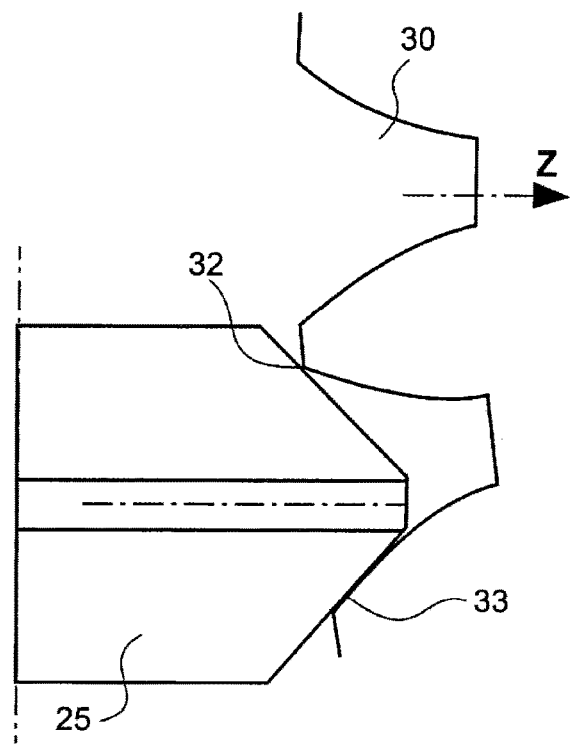
FIG. 7(b) shows the two-dimensional projection of a chamfering tool engaged in a tooth slot located below the gear center plane.

FIG. 7(b) shows the two-dimensional projection of a chamfering tool 25 engaged in a slot 31 which is below the center plane (X-Z). This tool position is equivalent to the tool position shown in FIG. 6 and is used to fulfill the requirement of a horizontal tool path tangent while the tool chamfers a certain point along the tool path 21. It can be seen that the angular conditions at the upper topland corner 32 are well suited to machine a sufficient chamfer or corner break. The contact conditions at the lower flank of the slot 31 are not acceptable because the tool 25 contacts the lower tooth within the flank surface at point 33.

The actual cutting position may not be in a symmetric position as shown in FIG. 7(a) (drawing is shown in plane X-Z of FIG. 6) but can be above or below the center plane of the workpiece as shown in FIG. 7(b) where the centerline of the tool is below the Z-axis of the work gear. It is also seen in FIG. 7(b) that the tool angles are asymmetric in order to cut chamfers which sufficiently break the topland corners.

Figure 8:
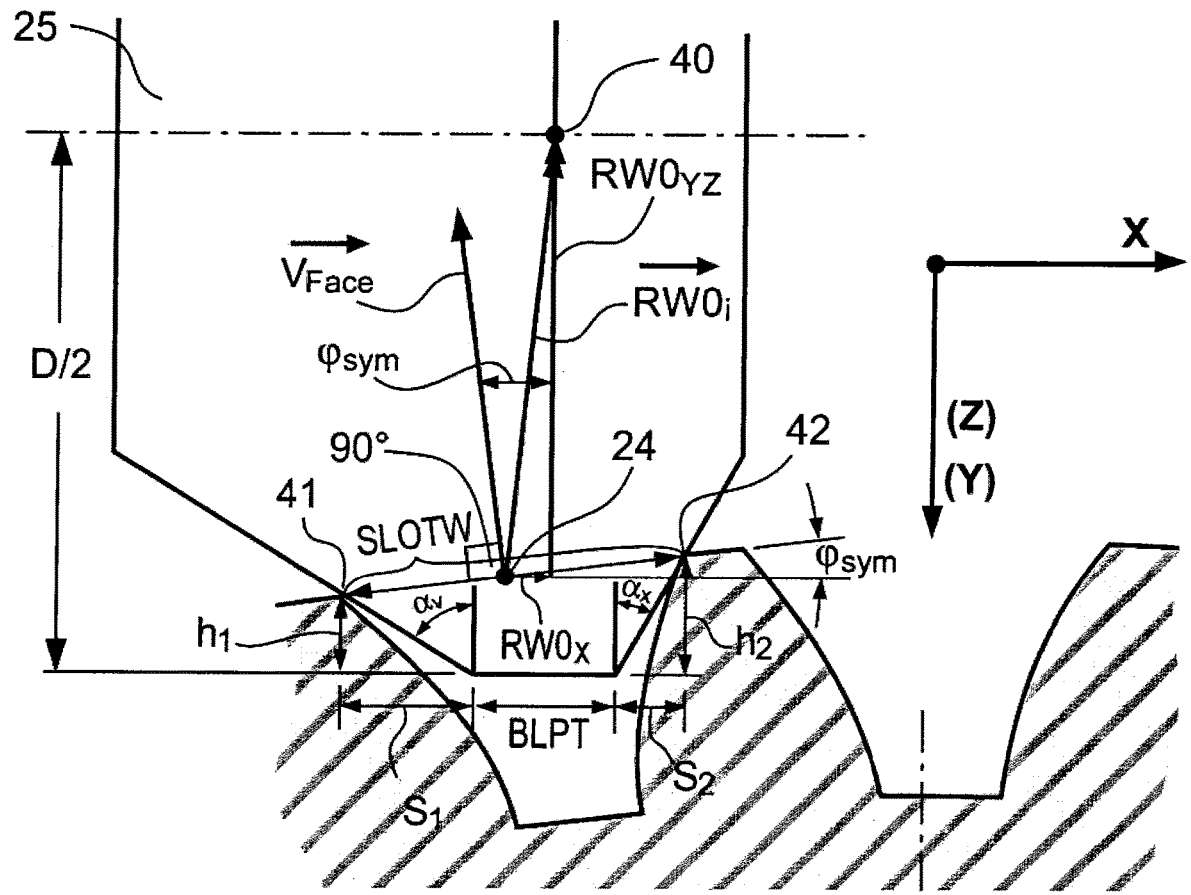
FIG. 8 shows, in a two-dimensional projection, a vector diagram including all vectors and dimensions required to determine the instant tool center point.

FIG. 8 represents an asymmetric chamfering position in combination with a tool with asymmetric tool angles as the general case. FIG. 8 shows in a two-dimensional projection the vector diagram including all vectors and dimensions required to calculate the instant tool center point. The tool is asymmetric versus the Y-Z plane (vertical direction in FIG. 8) in order to machine sufficient chamfers on the two topland corners 41 and 42. In order to position the tool correctly in relation to the slot, for each point of the tool path (shown is point 24) a vector $RW0_i$ has to be calculated. $RW0_i$ positions the tool center point 40 in the correct position relative to the instant point of the tool path 24. FIG. 8 also shows the tool tip width BLPT, the slot width SLOTW, the tool pressure angle $\alpha_x$ which chamfers the convex flank topland corner and $\alpha_y$ which chamfers the concave flank topland corner. The normal vector of the gear face cone $V_{Face}$ is shown in point 24. $\varphi_{sym}$ is the angle of asymmetry between the horizontal direction (X-axis) and the SLOTW connection line between points 41 and 42. Additional variables h1, h2, S1, S2, $RW0_{YZ}$, $RW0_X$ and D/2 are auxiliary values which are used in Equations (5) through (16).

The following formulae (5) through (16) provide an example determining the center point of the tool, versus an instant point along the tool path 20:

$$BLPT+S1+S2=SLOTW*\cos \varphi_{sym} \quad (5)$$

$$S1=h1*\tan \alpha_y \quad (6)$$

$$S2=h2*\tan \alpha_x \quad (7)$$

$$h2-h1=SLOTW*\sin \varphi_{sym} \quad (8)$$

$$h1=h2-SLOTW*\sin \varphi_{sym} \quad (9)$$

where:

BLPT ... Tip width of tool (FIG. 8)

S1 ... tool distance from right tip corner to contact point with right topland corner (FIG. 8)

S2 ... tool distance from left tip corner to contact point with left topland corner (FIG. 8)

h1 ... right contact point height from tool tip to contact point (FIG. 8)

h2 ... left contact point height from tool tip to contact point (FIG. 8)

$\alpha_y$ ... tool pressure angle towards convex gear flank (FIG. 8)

$\alpha_x$ ... tool pressure angle towards concave gear flank (FIG. 8)

SLOTW ... Normal slot width in one instant chamfer position (FIG. 8)

$\varphi_{sym}$ ... angle of asymmetry between topland connection and X-axis (FIG. 8)

Substitute S1 and S2 in equation (5) with (6) and (7) then substitute h1 with (8) and solve Equation h2:

$$h2=[SLOTW(\cos \varphi_{sym}+\sin \varphi_{sym} \tan \alpha_y)-BLPT)]/(\tan \alpha_y+\tan \alpha_x) \quad (10)$$

The offset vector between a point along the tool path 20 and the center 40 of the chamfer tool can be determined by:

$$RW0_x=(SLOTW/2)\cos \varphi_{sym}-h2 \tan \alpha_x-BLPT/2 \quad (11)$$

$$RW0_y=\{CDIA/2-[h2-(SLOTW/2)\sin \varphi_{sym}]\}V_{NRWy} \quad (12)$$

$$RW0_z=\{CDIA/2-[h2-(SLOTW/2)\sin \varphi_{sym}]\}V_{NRWz} \quad (13)$$

where:

$RW0_x$ ... X-component of connection of instant tool path point with center of tool $RW0_y$ ... Y-component of connection of instant tool path point with center of tool $RW0_z$ ... Z-component of connection of instant tool path point with center of tool CDIA ... Outer chamfer cutter diameter $V_{NRWx}$ ... X-component of shortest distance direction between instant tool path 20 and center 40 of chamfer tool $V_{NRWy}$ ... Y-component of shortest distance direction between instant tool path 20 and center 40 of chamfer tool $V_{NRWz}$ ... Z-component of shortest distance direction between instant tool path 20 and center 40 of chamfer tool The mathematical axis positions used in Equations (1) through (3) are determined from the coordinates along the tool path 50 and the Equations:

$$AXCTPT(1)_i=(PFL1_{xi}+PFL2_{xi})/2+RW0_x \quad (14)$$

$$AXCTPT(2)_i=(PFL1_{yi}+PFL2_{yi})/2+RW0_y \quad (15)$$

$$AXCTPT(3)_i=(PFL1_{zi}+PFL2_{zi})/2+RW0_z \quad (16)$$

where:

$PFL1_{xi}$ ... X-component of topland corner point$_i$ on convex flank $PFL1_{yi}$ ... Y-component of topland corner point$_i$ on convex flank $PFL1_{zi}$ ... Z-component of topland corner point$_i$ on convex flank $PFL2_{xi}$ ... X-component of topland corner point$_i$ on concave flank PFL2$_{yi}$ ... Y-component of topland corner point$_i$ on concave flank PFL2$_{zi}$ ... Z-component of topland corner point$_i$ on concave flank The chamfer tool position shown in FIG. 8 just provides contact between the sides of the tool and the toplands of the gear. In order to produce the desired chamfer width, the tool position is changed by a predetermined amount in the opposite direction of the vector V$_{Face}$.

Three modifications have also been developed for the optimization of the two simultaneously produced chamfers. A shift of the tool path 20 towards one of the two topland corners will increase the chamfer on this corner. An inclination of the tool path 20 along the face width of the slot will for example increase the chamfer width towards the heel and reduce it towards the toe. A rotation of the tool path 20 around the face cone normal vector V$_{Face}$ will increase the chamfer width, e.g. at the toe of the convex topland corner and at the heel of the concave topland corner.

Figure 9:
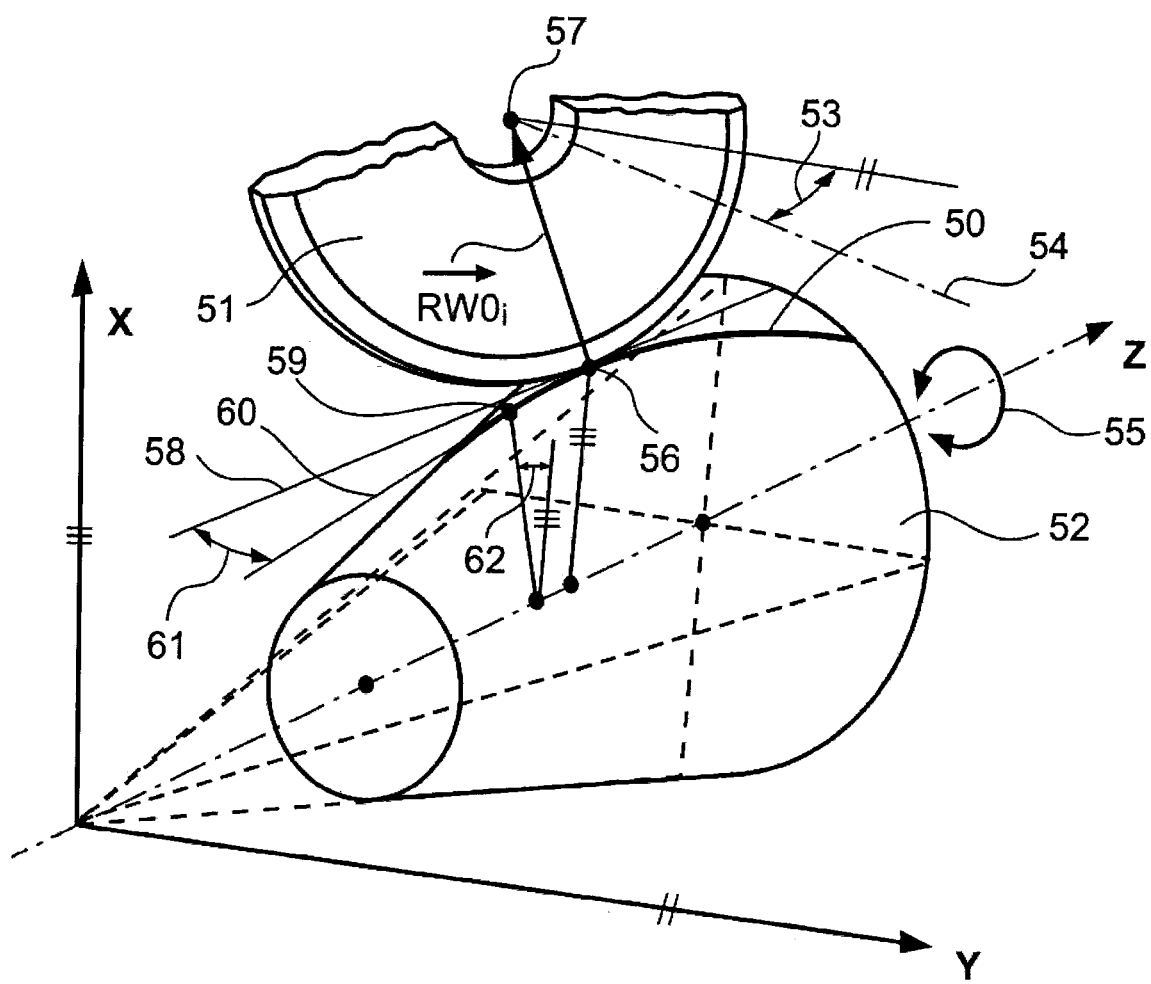
FIG. 9 shows the three-dimensional view of a pinion 52 and its Cartesian coordinate system. The chamfer tool 51 with its axis 54 follows the tool path 50.

FIG. 9 shows the three-dimensional view of a pinion 52 and its Cartesian coordinate system. The chamfer tool 51 with its axis 54 follows the tool path 50. While the tool 51 is positioned at one instant point of the tool path 50, the tool center point 57 has to be positioned at the tip of vector RW0 which originates at point 56. The tool axis 54 is rotated around the X-axis about angle 53 (swing angle) in order to provide a chamfering action which is tangential to the cutter path tangent 58. As the tool contact moves from point 56 to point 59, not only does the center coordinates of point 57 have to be changed, but the next discrete contacting point 59 between tool 57 and tool path 50 shows a different rotational location on the pinion cone which requires an incremental work rotation 62 in order to position point 59 in the vertical X-Z plane. Also, the tool path tangent at point 59 changes versus the tool path tangent at point 56, which requires a change of swing angle 53 by an amount of 61 (angle 61 has to be calculated in the Y-Z plane).

Topland chamfering can be conducted for bevel ring gears and bevel pinions. In case of ring gears, the teeth are grouped on the face of a flat cone which has a cone angle above 45°. In the case of pinions, the teeth are grouped on the surface of a slim cone with a cone angle below 45° (52 in FIG. 9). The ring gear cone is closer to a plane where the chamfer tool axis can be oriented in X-axis direction (FIG. 6) while the slot is being oriented horizontally for each instant chamfer position by rotation of the ring gear around the Z-axis (direction 26). The pinion cone 52 (FIG. 9) is closer to a cylinder. In this case the same configuration between the chamfer tool and topland corners as described for the ring gear chamfering can be achieved by placing the chamfer tool above the pinion (51 in FIG. 9) or below the pinion (depending on the spiral angle direction) with a tool axis 54 which is in a horizontal plane (Y-Z plane). The center of the chamfer tool is calculated using the same Equations (1) through (16) as explained for the ring gear chamfering while the chamfer tool moves along the tool path 50.

The significant difference of the tool motions in pinion chamfering versus ring gear chamfering is the additional angular inclination 53 of the chamfer tool (swing-angle). The angle 53 changes constantly while the tool travels the tool path 50. As in the case of ring gears, the stock division position is conducted in the middle of the face width. In addition to the stock division for gear chamfering, the angle 53 has to be adjusted to the direction of the tool path tangent vector V$_{Tan}$. The difference of V$_{Tan}$ in any other position versus V$_{Tan}$ in the stock division position is used to calculate the actual tool axis swing-angle BANG; (angle 53 in FIG. 9) for each instant tool position. The additional swing angle positions are calculated with the following Equation (17):

$$B_i = BANG_i + BSTDV - BANG_{stock\ div} \qquad (17)$$

where:

B$_i$ ... Machine swing-axis around X in FIG. 6
BANG$_i$ ... Mathematical swing-axis angle in position i
BANG$_{stock\ div}$ ... Mathematical machine swing-axis angle in stock division point
BSTDV ... Machine swing-axis position when tool is in contact with both topland corners in the stock division position Topland chamfering with a vertical tool axis according to FIG. 6 can only be applied to bevel gears with face cone angle above about 45° (ring gears). The application to bevel gears with face cone angles below about 45° (pinions) leads to unfavorable chamfer angles and cutting conditions.

Topland chamfering with a horizontal axis according to FIG. 9 allows topland chamfering for any desired face cone angle between 0° and 90°, which also allows topland chamfering of spur and helical gears, bevel pinions and gears as well as face gears and face couplings. The tool orientation according to FIG. 9 requires a 5-axes machine (inclusive of a coordinated work axis rotation).

While the invention has been discussed and exemplified with reference to bevel and hypoid gears (ring gears and pinions) produced by face milling, the invention is likewise applicable to gears produced by face hobbing. Also, other types of gears, such as straight bevel gears, spur gears, helical gears and face gears as well as face couplings may be provided with topland chamfers by the inventive method.

Furthermore, the chamfering tool may be a cutting tool or a grinding tool. The chamfering process may be implemented on a free-from cutting and grinding machine or on any other CNC machine having a minimum of four computer controlled axes.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of chamfering teeth on a gear, said gear comprising a plurality of teeth with each of said teeth having a pair of tooth flank surfaces, a tooth length, a topland surface extending along said tooth length and a topland corner at the intersection of each tooth flank surface and the topland, said topland corner extending along said tooth length, said plurality of teeth being spaced from one another by a tooth slot, said method comprising:

rotating a chamfering tool about a tool axis, said chamfering tool being a disc-shaped peripheral tool, moving said rotating chamfering tool through a tooth slot along the length of the teeth, said chamfering tool moving along a tool path, wherein the orientation of the tool axis is changed according to a swing axis angle during said moving along the tool path, whereby during said moving said chamfering tool contacts a topland corner on each tooth adjacent to said tooth slot thereby forming a chamfer extending along said tooth length on each of the adjacent teeth.

2. The method of claim 1 wherein said chamfering tool comprises a grinding wheel.

3. The method of claim 1 wherein said chamfering tool comprises a cutting tool.

4. The method of claim 1 where said moving begins at one of the toe or heel end of the tooth slot and ends at the other of the toe or heel end of the tooth slot.

5. The method of claim 4 further comprising indexing the gear to the next tooth slot position and moving the chamfering tool through the tooth slot in a reverse direction to that of the immediately preceding tooth slot.

6. The method of claim 1 wherein said gear comprises a ring gear.

7. The method of claim 1 wherein said gear comprises a pinion.

8. The method of claim 1 wherein said plurality of teeth on said gear are formed on a machine and said chamfering is carried out on the same machine.

9. The method of claim 8 wherein a plurality of machine axes are utilized on said machine to form said teeth and wherein moving said chamfering tool is carried out with at least a portion of said plurality of machine axes.

10. The method of claim 1 wherein said chamfering tool comprises a first side for chamfering a topland corner on a tooth adjacent said tooth slot and a second side for chamfering a topland corner on a successive tooth adjacent said tooth slot, said first side and said second side being asymmetric with respect to one another.

11. The method of claim 1 wherein said tool path extends through the center of said tooth slot.

12. The method of claim 1 wherein at one end of said tooth slot, said tool path is positioned closer to one topland than the other topland.

13. The method of claim 12 wherein at the other end of said tooth slot, said tool path is positioned closer said other topland than said one topland.

14. The method of claim 1 wherein said tool path is inclined in said tooth slot.

* * * * *